(12) United States Patent
Takayama et al.

(10) Patent No.: US 10,298,096 B2
(45) Date of Patent: May 21, 2019

(54) ELECTRIC MOTOR AND BLOWING APPARATUS

(71) Applicant: DAIKIN INDUSTRIES, LTD., Osaka-shi, Osaka (JP)

(72) Inventors: Yoshinori Takayama, Kusatsu (JP); Junji Tsukida, Kusatsu (JP)

(73) Assignee: Daikin Industries, Ltd., Osaka (JP)

(*) Notice: Subject to any disclaimer, the term of this patent is extended or adjusted under 35 U.S.C. 154(b) by 329 days.

(21) Appl. No.: 15/322,632

(22) PCT Filed: Jun. 12, 2015

(86) PCT No.: PCT/JP2015/067059
§ 371 (c)(1),
(2) Date: Dec. 28, 2016

(87) PCT Pub. No.: WO2016/002482
PCT Pub. Date: Jan. 7, 2016

(65) Prior Publication Data
US 2017/0133911 A1 May 11, 2017

(30) Foreign Application Priority Data

Jun. 30, 2014 (JP) .................................. 2014-133976

(51) Int. Cl.
*H02K 9/06* (2006.01)
*H02K 5/20* (2006.01)
(Continued)

(52) U.S. Cl.
CPC ................ *H02K 9/06* (2013.01); *H02K 5/20* (2013.01); *H02K 7/14* (2013.01); *H02K 7/086* (2013.01)

(58) Field of Classification Search
CPC .. H02K 9/06; H02K 5/20; H02K 7/14; H02K 7/086
See application file for complete search history.

(56) References Cited

U.S. PATENT DOCUMENTS 6,784,575 B2 8/2004 Okuda
7,946,118 B2* 5/2011 Hippen .................. F01M 11/02
184/6.16
(Continued)

FOREIGN PATENT DOCUMENTS

JP 10-309069 A 11/1998
JP 2001-124058 A 5/2001
(Continued)

OTHER PUBLICATIONS

European Search Report of corresponding EP Application No. 15 81 5462.5 dated Jan. 31, 2018.
(Continued)

*Primary Examiner* — Emily P Pham
(74) *Attorney, Agent, or Firm* — Global IP Counselors, LLP

(57) ABSTRACT

An electric motor includes a shaft extending along an axial direction, a stator, a rotor arranged farther away from the shaft than the stator in a radial direction of the shaft, a stator fixing part fixed to the shaft and fixed to the stator, and a rotor fixing part facing the stator fixing part and the stator with an air gap formed between in the axial direction. The rotor fixing part is rotatably coupled to the shaft and fixed to the rotor. A rotor hole is formed in the rotor fixing part. The rotor hole passes through the rotor fixing part to be communicated with the air gap. A stator hole is formed in the stator fixing part. The stator hole passes through the stator fixing part to be communicated with the rotor hole with the air gap formed between.

15 Claims, 5 Drawing Sheets

(51) Int. Cl.
 *H02K 7/14* (2006.01)
 *H02K 7/08* (2006.01)

(56) References Cited

U.S. PATENT DOCUMENTS

| | | | |
|---|---|---|---|
| 9,401,630 B2* | 7/2016 | Garrard | H02K 9/19 |
| 2004/0150270 A1 | 8/2004 | Nagayama et al. | |
| 2006/0170294 A1 | 8/2006 | Du | |
| 2008/0020696 A1 | 1/2008 | Van Gansen | |
| 2009/0230791 A1* | 9/2009 | Scharfenberg | H02K 7/1025 |
| | | | 310/62 |
| 2011/0140550 A1* | 6/2011 | Brandl | H02K 5/20 |
| | | | 310/57 |

FOREIGN PATENT DOCUMENTS

| | | |
|---|---|---|
| JP | 2001-339924 A | 12/2001 |
| JP | 2003-32982 A | 1/2003 |
| JP | 3513654 B2 | 1/2004 |
| KR | 10 2004 0045370 A | 6/2004 |
| WO | 2005/008860 A2 | 1/2005 |

OTHER PUBLICATIONS

International Preliminary Report of corresponding PCT Application No. PCT/JP2015/067056 dated Jan. 3, 2017.
International Search Report of corresponding PCT Application No. PCT/JP2015/067056 dated Jul. 28, 2015.

* cited by examiner

ELECTRIC MOTOR AND BLOWING APPARATUS

CROSS-REFERENCE TO RELATED APPLICATIONS

This U.S. National stage application claims priority under 35 U.S.C. § 119(a) to Japanese Patent Application No 2014-133976, filed in Japan on Jun. 30, 2014, the entire contents of which are hereby incorporated herein by reference.

TECHNICAL FIELD

The present disclosure relates to an electric motor and a blowing apparatus.

BACKGROUND ART

Japanese Patent No 3513654 describes an electric motor. According to Japanese Patent No. 3513654, the electric motor includes a stator and a rotor. The rotor faces the stator from an outer periphery side of the stator with an air gap therebetween. A shaft is disposed to pass through the stator. The stator is fixed to one end of the shaft so as not to rotate about the shaft, and the rotor is rotatably fixed to the shaft with a bearing therebetween. As a result, the rotor is rotatably fixed to the stator. The above electric motor drives an axial fan.

Japanese Patent Application Laid-Open No 10-309069 and Japanese Patent Application Laid-Open No. 2001-339924 are disclosed as techniques relating to the present disclosure.

SUMMARY

In Japanese Patent No. 3513654, a temperature increases in accordance with an operation of the electric motor. The temperature increase causes an increase in resistance of a winding of the stator, for example, and thereby is not desirable.

The present disclosure therefore has an object to provide an electric motor capable of suppressing a temperature increase in the electric motor.

An electric motor according to a first aspect of the present disclosure includes a shaft (30), a stator (20), a rotor (10), a stator fixing part (25), and a rotor fixing part (15). The shaft (30) extends along an axial direction. The rotor (10) is provided farther away from the shaft than the stator in a radial direction of the shaft. The stator fixing part (25) is fixed to the shaft and also fixed to the stator. The rotor fixing part (15) faces the stator fixing part and the stator with an air gap therebetween in the axial direction, is rotatably fixed to the shaft, and is also fixed to the rotor. The rotor hole (14) which passes through the rotor fixing part to be communicated with the air gap is formed in the rotor fixing part. The stator hole (28) which passes the stator fixing part to be communicated with the rotor hole with the air gap therebetween is formed in the stator fixing part.

In a second aspect of the electric motor according to the present disclosure, the electric motor according to the first aspect further includes a protruding part (27). The protruding part (27) is provided between the stator (20) and the rotor fixing part (15) and protrudes from one of the stator and the rotor fixing part toward other one of the stator and the rotor fixing part. The rotor hole (14) is located nearer the shaft (30) in relation to the protruding part.

In a third aspect of the electric motor according to the present disclosure, in the electric motor according to the second aspect, the protruding part (27) is fixed to the stator (20) and faces the rotor fixing part (15) with an air gap therebetween.

In a fourth aspect of the electric motor according to the present disclosure, the electric motor according to any one of the first to third aspects includes a bearing (41, 42). The bearing (41, 42) rotatably fixes the shaft (30) and the rotor fixing part (15). The stator (20) includes an inner peripheral surface (26) which faces the shaft (30) with an air gap therebetween in the radial direction.

In a fifth aspect of the electric motor according to the present disclosure, in the electric motor according to the fourth aspect, the stator hole (28) is formed in the stator fixing part (25) in a position nearer the shaft (30) in relation to the inner peripheral surface (26).

In a sixth aspect of the electric motor according to the present disclosure, in the electric motor according to any one of the first to fifth aspects, the stator hole (28) is located nearer the shaft (30) in relation to the rotor hole (14) in the radial direction.

A blowing apparatus according to a first aspect of the present disclosure includes the electric motor according to any one of the first to sixth aspect and a fan (60) which is fixed to the rotor fixing part (15) to draw air from the rotor hole (14).

According to the first aspect of the electric motor of the present disclosure, the air can pass through inside of the electric motor via the stator hole and the rotor hole, so that a temperature increase in the electric motor can be suppressed.

According to the second aspect of the electric motor of the present disclosure, even when a magnetic powder is mixed in air flowing between the rotor hole and the stator hole, an entry of the magnetic powder into the air gap can be suppressed by the protruding part.

According to the third aspect of the electric motor of the present disclosure, a communication part between the air gap between the stator and the rotor fixing part and the air gap can be kept away from each other.

According to the fourth aspect of the electric motor of the present disclosure, the air gap between the shaft and the stator as an adiabatic part, so that heat generated in the stator is hardly transferred to the shaft. Thus, a temperature increase in the bearing can be suppressed, and a reduction in a life-span of the bearing can be suppressed.

According to the fifth aspect of the electric motor of the present disclosure, air flows in a position near the shaft, so that the temperature increase in the bearing can further be suppressed, and the reduction in the life-span of the bearing can be suppressed.

According to the sixth aspect of the electric motor of the present disclosure, when the air flows from the stator hole to the rotor hole, the air at the entrance side (the stator hole side) flows near the shaft. Since the air at the entrance side is cooler than that of an exit side (the rotor hole side), the temperature increase in the shaft can be suppressed.

According to the first aspect of the blowing apparatus of the present disclosure, the air is flowed inside the electric motor by the fan, so that the temperature increase in the electric motor can be effectively suppressed.

These and other objects, features, aspects and advantages of the present disclosure will become more apparent from the following detailed description of the present disclosure when taken in conjunction with the accompanying drawings.

DETAILED DESCRIPTION OF EMBODIMENT(S)

Figure 1:
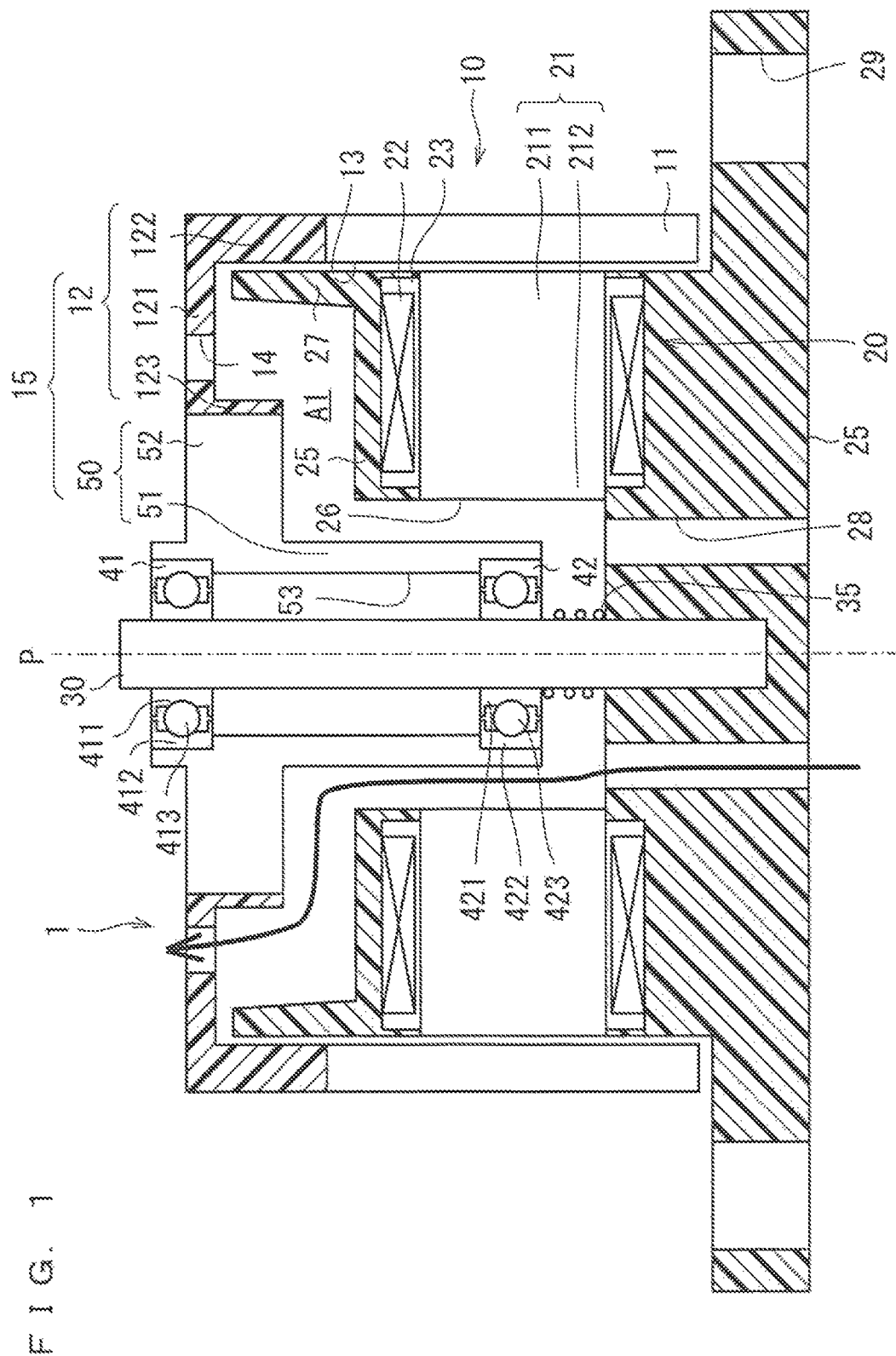
FIG. 1 is a sectional view of an example of a schematic configuration of an electric motor.

FIG. 1 is a sectional view of an example of a schematic configuration of an electric motor 1, illustrating the configuration of the electric motor 1 in a section including an imaginary axis of rotation P. The electric motor 1 includes a rotor 10, a stator 20, a shaft 30, a plurality of bearings 41 and 42, and a bearing housing 50.

The shaft 30 is a rod-shaped (for example, columnar) member extending along the axis of rotation P and has conductivity. The shaft 30 is made of, for example, metal such as stainless steel.

In the following description, a direction extending along the axis of rotation P is referred to as an axial direction, and a circumferential direction and a radial direction with respect to the axis of rotation P are merely referred to as a circumferential direction and a radial direction, respectively.

Figure 2:
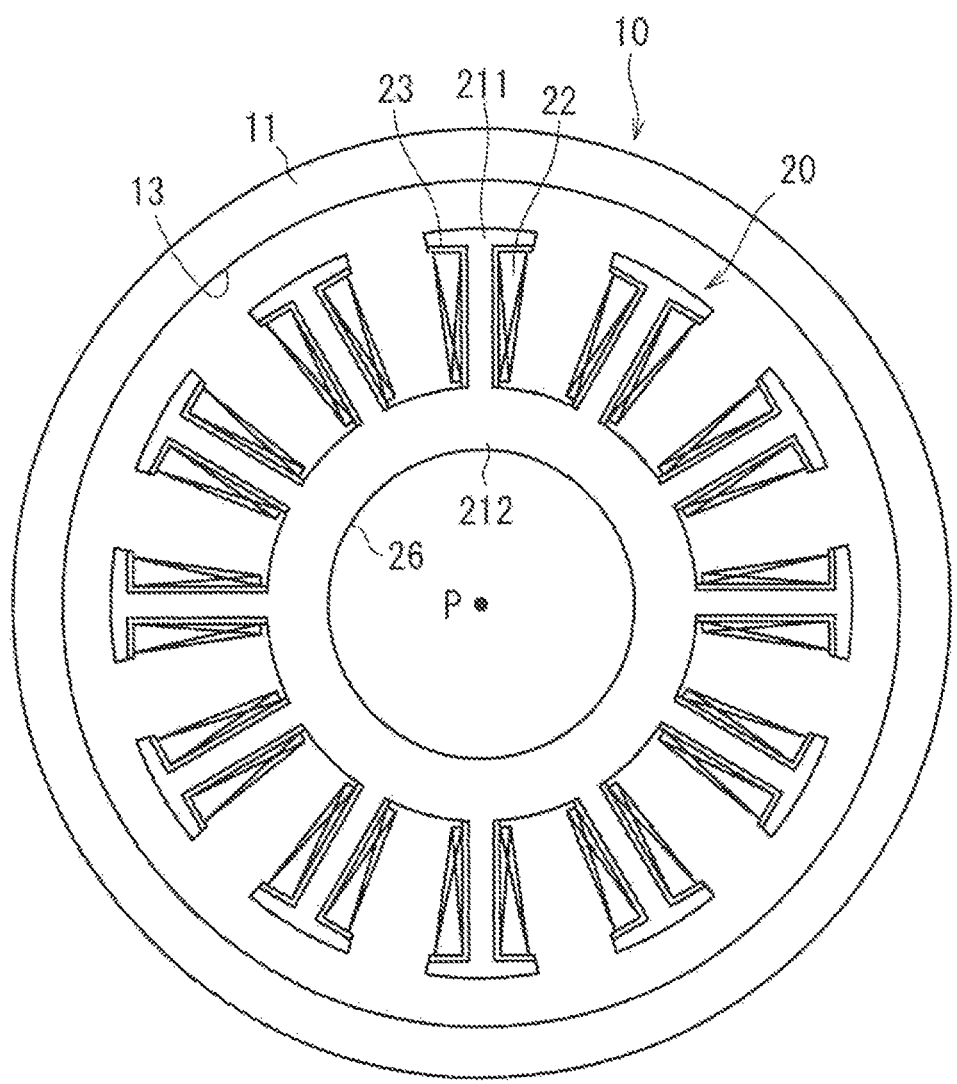
FIG. 2 is a sectional view of an example of schematic configurations of a stator and a rotor.

The stator 20 includes a stator core 21 and a winding 22. The stator core 21 is made of a soft magnetic material and has conductivity. The stator core 21 includes teeth 211 and a back yoke 212. FIG. 2 is a sectional view of an example of schematic configurations of the stator 20 and the rotor 10. FIG. 2 illustrates a section that is perpendicular to the axis of rotation P and passes through the teeth 211.

The teeth 211 are arranged around the shaft 30 (axis of rotation P). More specifically, the teeth 211 are spaced from one another along the circumferential direction and are radially arranged about the axis of rotation P.

The back yoke 212 magnetically couples ends (with reference to FIG. 1, inner-peripheral ends) of the teeth 211 to one another. The back yoke 212 has, for example, a tubular (approximately cylindrical) shape about the axis of rotation P.

The stator core 21 may be formed of, for example, laminated steel plates that are laminated along the axial direction. This reduces an eddy current generated in the stator core 21. The stator core 21 does not always need to be formed of laminated steel plates and, for example, may be a dust core including resin. This also reduces an eddy current.

The winding 22 is wound around the teeth 211 via, for example, an insulator 23. The winding 22 is wound around the teeth 211 with a winding axis being an axis that extends along the radial direction. The insulator 23 is formed of an insulating material and insulates the winding 22 from the teeth 211. Unless otherwise specified, "winding" in the present application does not refer to individual leads constituting a winding but refers to leads bound into a single group. The same also applies to the drawings. Leader lines at a start and end of winding and connections thereof are omitted as appropriate in the drawings.

The rotor 10 includes a magnetic pole member 11. The magnetic pole member 11 is a member that supplies a field magnetic flux to the stator 20 and faces the stator 20 with an air gap (called first air gap) therebetween. In the illustration of FIG. 1, the magnetic pole member 11 is provided at a side close to the outer periphery of the rotor 10 with respect to the stator 20 (opposite the shaft 30). In other words, the rotor 10 is provided in a position away from the shaft 30 with respect to the stator 20. The electric motor 1 is a so-called outer-rotor motor.

The magnetic pole member 11 is formed of, for example, a permanent magnet and has a pole surface directed to the stator 20. The polarity of the pole surface alternates in the circumferential direction. The magnetic pole member 11 is, for example, a bonded magnet and has, for example, a substantial tubular shape about the axis of rotation P. Thus, the magnetic pole member 11 has a hole 13 passing through the magnetic pole member 11, and the stator 20 is arranged inside the hole 13. A magnetic piece in the bonded magnet may be, for example, a ferrite magnet.

In the rotor 10 and the stator 20 as described above, an appropriate application of AC voltage to the winding 22 allows the stator 20 to supply a rotating magnetic field to the rotor 10. The rotor 10 accordingly rotates relative to the stator 20.

The stator 20 is fixed to the shaft 30 by a stator fixing part 25. That is to say, the stator fixing part 25 is fixed to the stator 20 and also fixed to the shaft 30. For example, the stator fixing part 25 is made of resin and is integrally formed with stator 20 and the shaft 30.

The stator fixing part 25 covers the stator 20 in a close contact manner at both sides of the stator 20 in the axial direction, for example. As shown in FIG. 2, in the presence of air gaps between the individual portions of the winding 22 in the circumferential direction, the stator fixing part 25 may fill the air gaps. A total number of windings (a total number of layers) of the winding 22 may be increased to reduce air gaps between the individual portions of the winding 22. This improves a volume fraction (packing factor) indicating a ratio of the winding 22 to the air gaps between the teeth 211, thereby improving an efficiency of the electric motor 1.

The stator fixing part 25 can cover the stator 20 to protect the stator 20. In the illustration of FIG. 1, however, a surface of the stator 20 opposing the rotor 10 (an outer peripheral surfaces of the teeth 211) is not covered with the stator fixing part 25 but is exposed. This is for reducing magnetic resistance between the stator 20 and the rotor 10. As a result, the efficiency of the electric motor 1 can be improved. Although the stator fixing part 25 does not cover an inner peripheral surface 26 of the back yoke 212 in the illustration of FIG. 1, the stator fixing part 25 may cover the inner peripheral surface 26. The inner peripheral surface 26 of the back yoke 212 can therefore be protected as well.

In the illustration of FIG. 1, the inner peripheral surface 26 of the back yoke 212 forms the hole. Although the hole is open in one side in the axial direction (referred to as the upper portion hereinafter), part of the hole is closed by the stator fixing part 25 in other side in the axial direction (referred to as the lower portion hereinafter). In the illustration of FIG. 1, the shaft 30 passes through the hole in the axial direction, and one end of the shaft 30 is buried into and fixed to the stator fixing part 25 on a bottom surface of the hole (a surface formed by the stator fixing part 25).

As described above, the stator fixing part 25 fixes the stator 20 and the shaft 30 to each other, and thus, also functions as a coupling part for coupling the stator 20 and the shaft 30 to each other.

The rotor 10 is rotatably fixed to the shaft 30 by a rotor fixing part 15 and the bearings 41 and 42. In the illustration of FIG. 1, a plurality of bearings 41 and 42 are mounted to the shaft 30. The bearing 41 includes an inner ring 411, an outer ring 412, and a rolling element 413. The inner ring 411, the outer ring 412, and the rolling element 413 has conductivity, for example. The inner ring 411 has a ring shape and, on its inner peripheral surface, is fixed to the shaft 30 while being in contact therewith. The outer ring 412 has a ring shape with a diameter larger than the diameter of the inner ring 411 and faces the inner ring 411 from its outer peripheral side. The rolling element 413 has, for example, a ball shape and rolls between the inner ring 411 and the outer ring 412 so that the outer ring 412 rotates relative to the inner ring 411. A lubricating oil (grease) not shown is applied between the inner ring 411 and the rolling element 413 and between the outer ring 412 and the rolling element 413 to reduce friction between the inner ring 411 and the rolling element 413 and between the outer ring 412 and the rolling element 413.

The bearing 42 includes an inner ring 421, an outer ring 422, and a rolling element 423. The bearing 42 has the same structure as the structure of the bearing 41, which will not be described repeatedly.

The bearings 41 and 42 are fixed to the shaft 30, with the inner rings 411 and 421 fitted with the shaft 30. The bearings 41 and 42 are mounted to the shaft 30 with an interval between these bearings in the axial direction. Although the two bearings 41 and 42 are provided in the illustration of FIG. 1, only one bearing or three or more bearings may also be provided.

The rotor fixing part 15 faces the stator 20 and the stator fixing part 25 with an air gap therebetween in the axial direction. The rotor fixing part 15 is rotatably fixed to the shaft 30 with the bearings 41 and 42 therebetween, and is also fixed to the rotor 10.

In the illustration of FIG. 1, the rotor fixing part 15 includes the bearing housing 50 and a coupling part 12. The bearing housing 50 is a conductive member, for example, and is made of metal (such as aluminum), for example. The bearing housing 50 has a tubular shape surrounding the shaft 30 with an air gap therebetween, for example, and contacts the outer rings 412 and 422 of the bearings 41 and 42. The bearing housing 50 faces the shaft 30 with an air gap therebetween, between the bearings 41 and 42.

In the illustration of FIG. 1, the bearing 41 is arranged above the stator 20 in the axial direction, and the bearing 42 is located inside the hole formed by the inner peripheral surface 26. In other words, the bearing 42 is located at a position at which the bearing 42 opposes the stator 20 in the radial direction. In the illustration of FIG. 1, the bearing housing 50 contacts both the bearings 41 and 42, and accordingly, extends from an inside of the hole formed by the inner peripheral surface 26 upwardly beyond the stator 20.

In the illustration of FIG. 1, the bearing housing 50 extends so as to expand toward its outer periphery in an area above the stator 20. In the illustration of FIG. 1, thus, a description can be given that the bearing housing 50 includes a tubular member 51, which contacts the bearings 41 and 42, and a flange portion 52, which expands from the upper portion of the tubular member 51 toward an outer periphery thereof.

The coupling part 12 is fixed to the bearing housing 50 and the rotor 10 to couple the bearing housing 50 and the rotor 10 to each other. The coupling part 12 includes, for example, an inner tubular portion 123, an upper surface portion 121, and an outer tubular portion 122. The inner tubular portion 123 has a tubular shape and is fixed to the bearing housing 50 at an outer-peripheral end of the flange portion 52. The upper surface portion 121 expends from an upper end portion on the outer peripheral side of the inner tubular portion 123 toward an outer periphery of the coupling part 12. The upper surface portion 121 has, for example, a plate ring shape. The outer tubular portion 122 has a tubular shape projecting downwardly in the axial direction from an outer peripheral edge of the upper surface portion 121. The outer tubular portion 122 is fixed to the rotor 10 (magnetic pole member 11).

The coupling part 12 is made of, for example, resin and is formed integrally with, for example, the bearing housing 50 and the rotor 10.

In the structure described above, the rotor 10 rotates together with the bearing housing 50 and the coupling part 12 relative to the shaft 30.

In the illustration of FIG. 1, between the bearing 42 and the stator fixing part 25 is provided a preload spring 35. The preload spring 35 is a spring formed of an elastic body extending helically, through which the shaft 30 passes. The preload 35 biases the bearing 42 and the stator fixing part 25 in such a direction that the bearing 42 and the stator fixing part 25 move away from each other.

In the electric motor 1, a rotor hole 14 is formed in the rotor fixing part 15. The rotor hole 14 passes through the rotor fixing part 15 and is thereby communicated with an air gap A1 located between a group of the stator 20 and stator fixing part 25 and the rotor fixing part 15. Accordingly, the rotor hole 14 causes an outside of the electric motor 1 and the air gap A1 to be communicated with each other.

Figure 3:
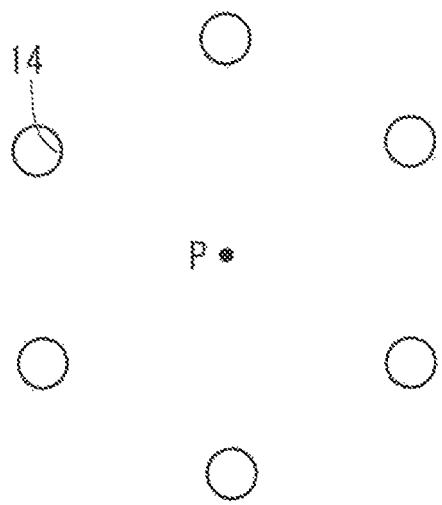
FIG. 3 is a sectional view of an example of a schematic configuration of a rotor hole.
Figure 4:
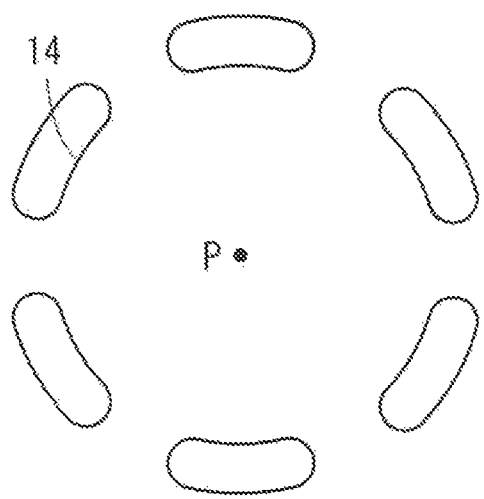
FIG. 4 is a sectional view of an example of a schematic configuration of a rotor hole.

In the illustration of FIG. 1, the rotor hole 14 is formed in the coupling part 12 and passes through the coupling part 12 along the axial direction, for example. A plurality of rotor holes 14 may be provided with an interval between the rotor holes 14 around the axis of rotation P. For example, the rotor hole 14 may have, as shown in FIG. 3, a substantial circular shape when viewed along the axial direction or, as shown in FIG. 4, an elongated shape which is long in the circumferential direction. When a plurality of the rotor holes 14 are provided in the circumferential direction, the rotor holes 14 may have substantially the same shape and are arranged with at regular intervals.

The air gap A1 also extends between the stator 20 and the bearing housing 50 in the radial direction and between the stator 20 and the shaft 30 in the radial direction.

As shown in FIG. 1, a stator hole 28 is formed also in the stator fixing part 25. The stator hole 28 passes through the stator fixing part 25 and is thereby communicated with the rotor hole 14 with the air gap A1 therebetween. The stator hole 28 is located in an inner peripheral side of the inner peripheral surface 26 of the stator 20, for example, (more specifically, between the shaft 30 and the inner peripheral surface 26) and passes through the stator fixing part 25 along the axial direction, for example. A plurality of stator holes 28 may be provided in a similar manner to the rotor holes 14, and also may be provided with an interval between the stator holes 28 around the axis of rotation P. The stator hole 28 may have a substantial circular shape, for example, when viewed along the axial direction or an elongated shape which is long in the circumferential direction. When the plurality of the stator holes 28 are provided in the circumferential direction, the stator holes 28 may have substantially the same shape and are arranged with at regular intervals.

In the electric motor 1 as described above, the appropriate application of AC voltage to the winding 22 allows the stator 20 to supply a rotating magnetic field to the rotor 10. The rotor 10 accordingly rotates relative to the stator 20. Then, when the current flows in the winding 22, a temperature of the electric motor 1 increases due to Joule heat. Particularly, a temperature of the stator 20 (the winding 22 and the stator core 21) increases. The temperature increases as described above causes an increase in resistance of the winding 22, for example, thereby reducing the efficiency of the electric motor 1.

According to the present electric motor 1, the inside of the electric motor 1 is communicated with the outside via the rotor hole 14 and the stator hole 28. Thus, one of the rotor hole 14 and stator hole 28 can function as an entrance to the inside of the electric motor 1 and other one can function as an exit from the inside of the electric motor 1. The air can therefore flow from the entrance to the exit through the inside of the electric motor 1. As a result, a flowability of the air flowing inside the electric motor 1 can be improved. In the illustration of FIG. 1, an example of the flow of the air is indicated by thick arrows.

As described above, the inside of the electric motor 1 can be air-cooled, and the temperature increase in the electric motor 1 can be thereby suppressed. Accordingly, the increase in resistance of the winding 22 associated with the temperature increase can be suppressed, for example, and the efficiency reduction in the electric motor 1 can be suppressed. Moreover, since the lubricating oil of the bearings 41 and 42 deteriorates due to the temperature increase, the deterioration of the lubricating oil can also be suppressed. As a result, a reduction in a life-span of the bearings 41 and 42 can be suppressed.

Figure 5:
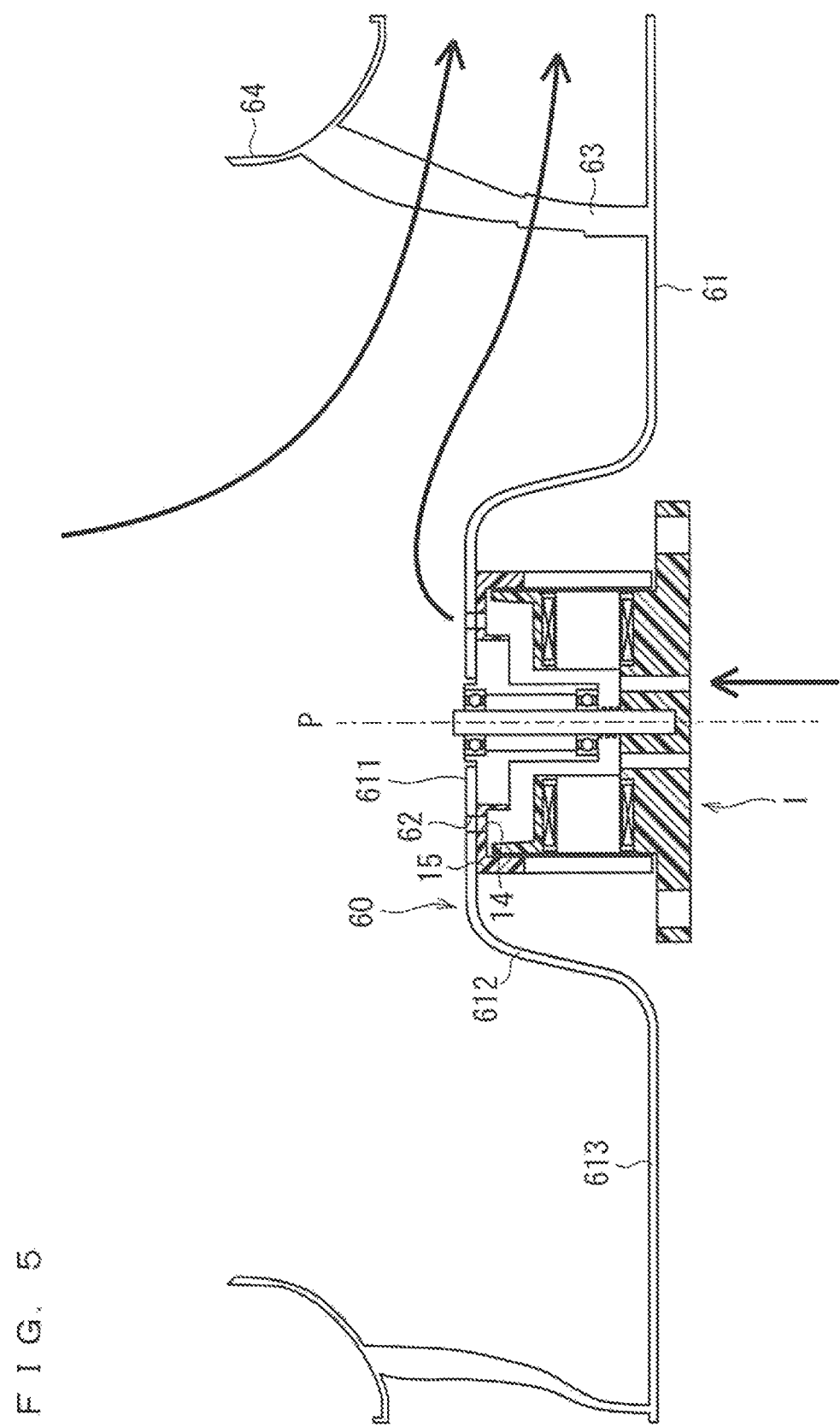
FIG. 5 is a sectional view of an example of a schematic configuration of a blowing apparatus.
Figure 6:
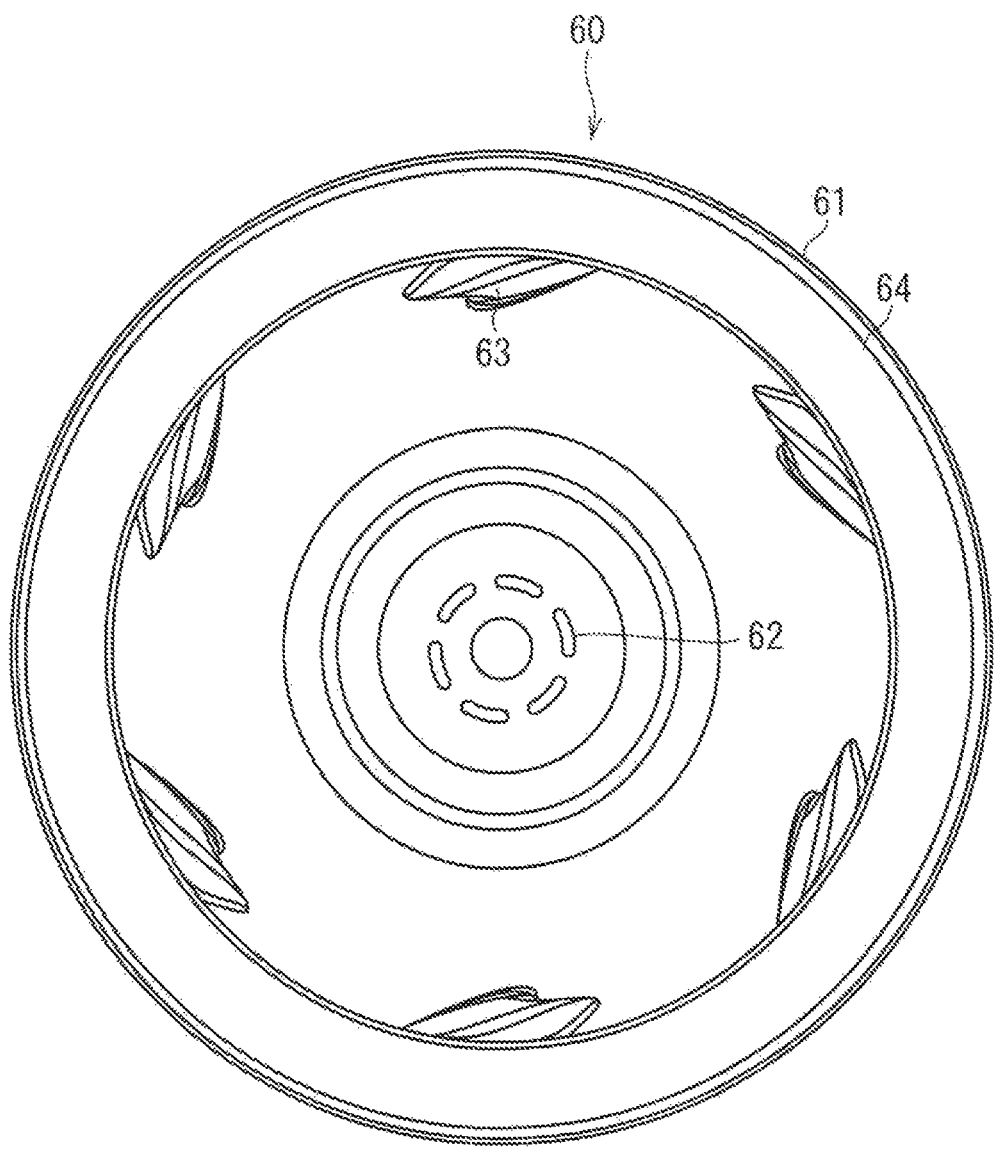
FIG. 6 is a plan view of an example of a schematic configuration of a blowing apparatus.

The present electric motor 1 drives a fan, for example. FIG. 5 is a sectional view of an example of a schematic configuration of a blowing apparatus provided with a fan 60 and the electric motor 1, and FIG. 6 is a plan view of an example of a schematic configuration of the fan 60.

The fan 60 is fixed to the rotor fixing part 15 and rotates in accordance with the rotation of the rotor 10. In accordance with this rotation, the fan 60 draws the air from the rotor hole 14. For example, in the illustrations of FIGS. 5 and 6, the fan 60 is a centrifugal fan, and as a more specific example, the fan 60 is a turbo fan.

The fan 60 includes an attachment plate 61, a plurality of blades 63, and an upper plate 64. The attachment plate 61 faces and is fixed to the rotor fixing part 15 in the axial direction. In the illustration of FIG. 5, the attachment plate 61 includes a portion 611 facing the rotor fixing part 15, a portion 612 extending from an outer-peripheral end of the portion 611 in a substantial axial direction so as to surround the electric motor 1, and a portion 613 expanding from an end of the portion 612 located in a farther side from the portion 611 toward the outer periphery side. That is to say, the attachment plate 61 has a plate shape whose central part is raised, and has an appearance of a substantial circular shape about the axis of rotation P when viewed along the axial direction.

The plurality of blades 63 are arranged side by side around the axis of rotation P with an air gap therebetween and is fixed to the attachment plate 61. The plurality of blades 63 is attached to an outer peripheral side of the electric motor 1. Each of the plurality of blades 63 is provided so that its one end in the circumferential direction is located in an inner periphery side with respect to its other end in the circumferential direction. The upper plate 64 is fixed on an opposite side of the attachment plate 61 with respect to the blades 63. The upper plate 64 has a ring shape about the axis of rotation P when viewed along the axis of rotation P.

A through hole 62 is formed in the attachment plate 61. The through hole 62 passes through the attachment plate 61 in the axial direction to be communicated with the rotor hole 14.

In the above blowing apparatus, in accordance with the rotation of the electric motor 1 and the fan 60, the fan 60 mainly draws the air from an upper part via an opening of the upper plate 64 and blows out the air to the outside in the radial direction. In the meanwhile, in accordance with the rotation of the electric motor 1 and the fan 60, the fan 60 also draws the air from the rotor hole 14. That is to say, the air is drawn inside the electric motor 1 via the stator hole 28, and subsequently drawn inside the fan 60 via the rotor hole 14 and the through hole 62. The air drawn inside is blown outside in the radial direction.

As described above, the air flows inside the electric motor 1 in accordance with the rotation of the electric motor 1 and the fan 60, so that the temperature increase in the electric motor 1 can be suppressed. As a result, the increase in resistance of the winding 22 associated with the temperature increase can be suppressed, so that the efficiency of the electric motor 1 can be improved.

In the illustrations of FIGS. 5 and 6, the electric motor 1 drives the fan 60 to cause a differential pressure between an upper region in the axial direction and a lower region in the axial direction, thereby flowing the air inside the electric motor 1. However, the present disclosure is not necessarily limited to the above configuration. It is also applicable to flow the air inside the electric motor 1 using a natural wind or other blowing apparatus.

However, when the air blow of the fan 60 is used to flow the air inside the electric motor 1 as shown in FIGS. 5 and 6, the air can be forcibly flowed compared with the natural wind, so that the electric motor 1 can be effectively cooled. Moreover, a manufacturing cost can be reduced compared with the case of providing the blowing apparatus separately.

A protruding part 27 is provided in the illustration of FIG. 1, for example. The protruding part 27 is provided between the rotor fixing part 15 and the stator 20. The protruding part 27 is fixed to the stator 20 and protrudes from the stator 20 in the axial direction to face the rotor fixing part 15 with an air gap therebetween. The protruding part 27 has, for example, a substantial tubular shape about the axis of rotation P. That is to say, the protruding part 27 is provided in a whole circumference about the axis of rotation P.

In the illustration of FIG. 1, the protruding part 27 is made of resin and is formed integrally with the stator fixing part 25. Accordingly, the protruding part 27 and the stator fixing part 25 can be easily manufactured.

Moreover, in the illustration of FIG. 1, the rotor hole 14 is located in an inner peripheral side of the protruding part 27 (the side of the shaft 30).

According to the above configuration, it is possible to suppress the air, which has flowed inside the electric motor 1 from the stator hole 28, flowing into the first air gap. The reason is that the protruding part 27 narrows an entrance to the first air gap (an air gap between the rotor fixing part 15 and the protruding part 27). Thus, a dust in the air can be prevented from entering the first air gap. In regard to the above point, an interval between the rotor fixing part 15 and the protruding part 27 in the axial direction may be smaller than a width of the rotor hole 14 in the radial direction.

Accordingly, the air can be led to the rotor hole 14 rather than the entrance to the first air gap, so that the air (the dust) can hardly enter the first air gap.

Even when a magnetic powder is mixed in the air flowing inside the electric motor 1, an entry of the magnetic powder into the first air gap can also be suppressed by the protruding part 27. A magnetic attractive force acts on the magnetic powder between the magnetic powder and the rotor 10 or the stator 20, and the magnetic power is thereby attracted to the first air gap side regardless of the air flow. That is to say, the magnetic power is attracted to an outer periphery side and a lower side in the axial direction. As a result, the magnetic powder collides with the protruding part 27, so that the entry of the magnetic powder into the first air gap can be prevented or suppressed.

Differing from the illustration of FIG. 1, the protruding part 27 may be fixed to the rotor fixing part 15 and face the stator 20 (the stator fixing part 25) with an air gap therebetween. The reason is that the entrance to the first air gap can be narrowed compared with the structure that no protruding part 27 is provided.

In the meanwhile, it is desirable that the protruding part 27 is fixed to the stator 20 (the stator fixing part 25) as shown in FIG. 1. The reason is that a communication part between the air gap between the stator 20 and the rotor fixing part 15 and the first air gap can be kept away from each other. According to the above configuration, it gets harder that the dust enters the first air gap.

Although the magnetic powder is attracted to the first air gap, the magnetic powder which has collided with the protruding part 27 may move in a lower side in the axial direction by the magnetic attractive force. Thus, also from the above viewpoint, it is desirable that the protruding part 27 is fixed to the stator 20. Even when the magnetic powder moves in the lower side in the axial direction, the gap between the protruding part 27 and the stator 20 (the stator fixing part 25) is reduced as long as they are fixed to each other, so that the magnetic powder can hardly enter the first air gap. The entry of the magnetic powder can be prevented when the whole circumference of protruding part 27 is fixed to the stator 20 and there is no gap between the protruding part 27 and the stator 20.

In the illustration of FIG. 1, the stator core 21 faces the shaft 30 and the bearings 41 and 42 with an air gap therebetween. Since the air gap can function as an adiabatic part, even when the heat generated in the winding 22 is easily transferred to the stator core 21, it is hardly transferred to the bearings 41 and 42. As a result, the temperature increase in the bearings 41 and 42 can be suppressed, and the reduction in the life-span of the bearings 41 and 42 can therefore be suppressed.

In the illustration of FIG. 1, the stator hole 28 is located in the side of the shaft 30 with respect to the inner peripheral surface 26. Accordingly, the air flows inside the electric motor 1 in a position near the shaft 30. As a result, the temperature increase in the bearings 41 and 42 which are attached to the shaft 30 can be suppressed, and the reduction in the life-span of the bearings 41 and 42 can therefore be suppressed.

In the illustration of FIG. 1, the stator hole 28 is located in the side of the shaft 30 with respect to the rotor hole 14. Thus, when the stator hole 28 functions as the entrance of the air, an outside air can be sent in a position near the shaft 30. The air flowing outside from the rotor hole 14 has been heated in the electric motor 1. Since the cooler air (the air flowing from the stator hole 28) flows the position near the shaft 30, the shaft 30 and then the bearings 41 and 42 can be efficiently coded. The above configuration is particularly effective when the fan 60 is used. The reason is that the fan 60 can cause the stator hole 28 and the rotor hole 14 to function as the entrance and the exit, respectively.

The above embodiments of the present disclosure can be appropriately modified or omitted as long as they are consistent with each other.

While the electric motor has been shown and described in detail, the foregoing description is in all aspects illustrative and not restrictive. It is therefore understood that numerous modifications and variations can be devised without departing from the scope of the disclosure.

What is claimed is:

1. An electric motor, comprising:
    a shaft extending along an axial direction;
    a stator;
    a rotor arranged farther away from said shaft than said stator in a radial direction of said shaft;
    a stator fixing part fixed to said shaft and fixed to said stator;
    a rotor fixing part facing said stator fixing part and said stator with an air gap formed therebetween in said axial direction, said rotor fixing part being rotatably coupled to said shaft and fixed to said rotor,
    a rotor hole being formed in said rotor fixing part, said rotor hole passing through said rotor fixing part to be communicated with said air gap, and
    a stator hole being formed in said stator fixing part, said stator hole passing through said stator fixing part to be communicated with said rotor hole and with said air gap formed therebetween.

2. The electric motor according to claim 1, further comprising:
    a protruding part disposed between said stator and said rotor fixing part and protruding from one of said stator and said rotor fixing part toward an other one of said stator and said rotor fixing part,
    said rotor hole being is located nearer to said shaft than said protruding part.

3. The electric motor according to claim 2, wherein
    said protruding part is fixed to said stator and faces said rotor fixing part with an air gap formed therebetween.

4. The electric motor according to claim 3, further comprising:
    a bearing rotatably attaching said shaft and said rotor fixing part,
    said stator including an inner peripheral surface that faces said shaft with an air gap formed therebetween in said radial direction.

5. The electric motor according to claim 4, wherein
    said stator hole is formed in said stator fixing part in a position nearer to said shaft than said inner peripheral surface.

6. The electric motor according to claim 3, wherein
    said stator hole is located nearer to said shaft than said rotor hole in said radial direction.

7. A blowing apparatus including the electric motor according to claim 3, the blowing apparatus further comprising:
    a fan fixed to said rotor fixing part in order to draw air from said rotor hole.

8. The electric motor according to claim 2, further comprising:
    a bearing rotatably attaching said shaft and said rotor fixing part, said stator including an inner peripheral surface that faces said shaft with an air gap formed therebetween in said radial direction.

9. The electric motor according to claim 8, wherein said stator hole is formed in said stator fixing part in a position nearer to said shaft than said inner peripheral surface.

10. The electric motor according to claim 2, wherein said stator hole is located nearer to said shaft than said rotor hole in said radial direction.

11. A blowing apparatus including the electric motor according to claim 2, the blowing apparatus further comprising:
a fan fixed to said rotor fixing part in order to draw air from said rotor hole.

12. The electric motor according to claim 1, wherein said stator hole is located nearer to said shaft than said rotor hole in said radial direction.

13. A blowing apparatus including the electric motor according to claim 1, the blowing apparatus further comprising:
a fan fixed to said rotor fixing part in order to draw air from said rotor hole.

14. The electric motor according to claim 1, further comprising:
rotatably attaching said shaft and said rotor fixing part, said stator including an inner peripheral surface that faces said shaft with an air gap formed therebetween in said radial direction.

15. The electric motor according to claim 14, wherein said stator hole is formed in said stator fixing part in a position nearer to said shaft than said inner peripheral surface.

\* \* \* \* \*